(No Model.)

E. SILTBERG.
PNEUMATIC TIRE FOR WHEELS.

No. 497,831. Patented May 23, 1893.

Witnesses
Thos E. Halford
W Warner

Inventor
Enoch Siltberg
per Fredk Walker
attorney

UNITED STATES PATENT OFFICE.

ENOCH SILTBERG, OF YORK, ENGLAND.

PNEUMATIC TIRE FOR WHEELS.

SPECIFICATION forming part of Letters Patent No. 497,831, dated May 23, 1893.

Application filed October 31, 1892. Serial No. 450,484. (No model.) Patented in England April 26, 1892, No. 7,859.

*To all whom it may concern:*

Be it known that I, ENOCH SILTBERG, a subject of the Queen of Great Britain, residing at No. 12 Spurriergate, in the city of York, England, have invented certain new and useful Improvements in the Method of Attaching Tires to Wheels, (for which I have applied for Letters Patent in Great Britain, No. 7,859, bearing date April 26, 1892,) of which the following is a specification.

My invention relates to improvements in the method of attaching pneumatic or inflated tires to the wheels of cycles and other vehicles, and the objects of my improvements are to enable such tires to be attached to wheels without the aid of cement wires and the like. I attain these objects by the method illustrated in the accompanying drawings in which—

Figure 1:
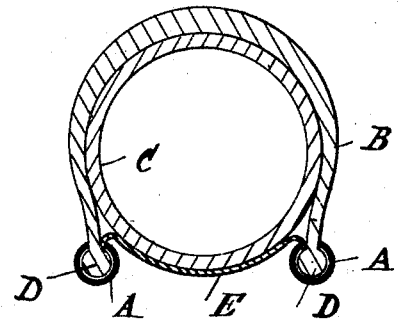
Figure 2:
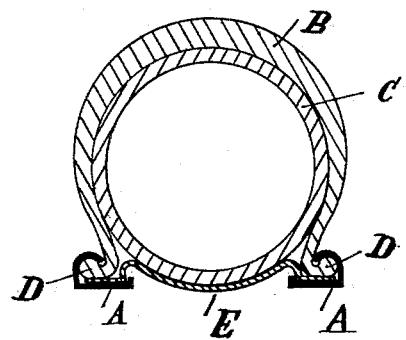
Figure 3:
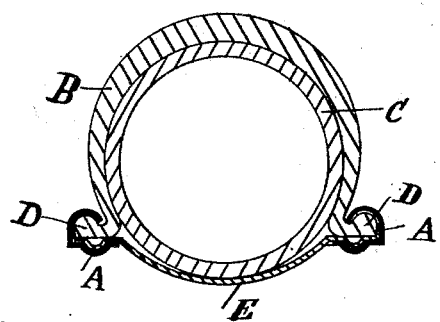

Figure 1 represents a section of a pneumatic or air inflated tire attached to the rim of a wheel both constructed according to this invention. Figs. 2 and 3 are modifications of the same.

The same letters denote the same parts in all the figures.

Now according to this invention I construct a metal tube A of circular, square or other suitable cross-section, in such a manner that the edges thereof do not meet, thus forming a continuous slot in the tube which is bent lengthwise so as to form a circle approximately of the same diameter as the rim of the wheel. The ends of the bent tubes are not joined together. The outer protective covering B that partly envelops pneumatic or inflated tube C is provided with a beading D on each edge which may be made by embedding a cord in the material of which the covering B is composed or by sewing or otherwise attaching a cord to the said edges or which may be molded in the material itself. The outer covering B forms a continuous band and each beading D is cut through at one point to allow of the beading being threaded through the bent tubes A of which there is one on each side of the wheel. The material forming the covering B passes through the slots formed by the open edges of the tube. A tube A is fitted to each edge of the covering B and the edges of the rim of the wheel are turned over or otherwise formed to fit into and with the covering B fill the slots or nearly so, so that when the pneumatic tube C is inflated both it and the outer covering B are both firmly secured to the rim E of the wheel.

The tubes A A form metallic edges for the covering B the beaded edges of which are firmly retained within the said tubes as the slots are only of sufficient width to allow the fabric to pass, the said fabric being compressed when the edges of the rim E are forced into the slots. I may in some cases turn the edges of the tubes A slightly outward to avoid chafing the fabric of which the covering B is composed or I may attach strips of canvas or other suitable material to the covering B where it passes through the slotted tubes A for the same purpose.

Having fully described my invention, what I claim, and desire to secure by Letters Patent, is—

In attaching tires to wheels the combination of slotted or slit tubes A A with a rim E having the edges thereof adapted to fit the said tubes and an outer covering B having beaded edges D D all substantially as described and for the purposes stated.

ENOCH SILTBERG.

Witnesses:
 CHARLES DOWNEY,
 GEORGE WILLIAM CURRY,
*Clerks to Messrs. Holtby & Proctor, Solicitors,
 5 New Street, York.*